MAGNETIC TAPE TRANSDUCER

Filed June 11, 1958 3 Sheets-Sheet 1

INVENTOR.
CHARLES J. PETERS
BY
Spencer E. Olson
ATTORNEY

MAGNETIC TAPE TRANSDUCER

Filed June 11, 1958 3 Sheets-Sheet 2

INVENTOR.
CHARLES J. PETERS
BY Spencer E. Olson
ATTORNEY

INVENTOR.
CHARLES J. PETERS
BY Spencer E. Olson
ATTORNEY

United States Patent Office 3,152,225

Patented Oct. 6, 1964

3,152,225

MAGNETIC TAPE TRANSDUCER

Charles J. Peters, Acton, Mass., assignor, by mesne assignments, to Sylvania Electric Products Inc., Wilmington, Del., a corporation of Delaware Filed June 11, 1958, Ser. No. 741,401

29 Claims. (Cl. 179—100.2)

This invention relates generally to the magnetic recording of signals, and more particularly to a transducer for the recording of video signals on magnetic tape.

Magnetic recording, on a specially designed tape, wire or drum, has long been known and used, and the many advantages of such recording have extended its use into many fields. Some of the advantages of magnetic recording are its capability of great accuracy, the speed and simplicity with which recordings can be made, and the ability to erase the recording when its purpose has been served. Until relatively recently, however, magnetic recording has been restricted to relatively low frequency signals, nominally at audio frequencies. With the advent of television and high speed computers with the attendant requirement for the recording of video signals, the magnetic recording art has been extended in significant respects, particularly in regard to improved tape materials, tape transport mechanisms, and techniques extending the frequency which can be recorded with practicably obtainable relative velocities between the tape and the recording head. It is well substantiated, for audio tape recorders, that the proportionality constant between the maximum signal frequency which can be recorded on a magnetic tape and the relative velocity between the tape and the recording head is approximately 2 kc./in. Thus, if conventional audio recorder techniques were to be used to record a signal with an upper cutoff of one megacycle/sec., a tape speed of approximately 500 inches/sec. would be required. At present, the maximum practical tape speed obtainable is about 60 to 120 inches/sec., and it is desirable to operate at lower speeds. Thus, it is apparent that recording techniques different than those employed for audio recording are necessary to record video signals, for example, television programs or the like.

Apart from the brute force method of pulling the tape past the recording head fast enough that the video signal (e.g., 4 to 5 megacycles/sec.) appears on the tape as a wavelength about the same as the shortest used in audio (which it has been indicated is not practical), two possible ways to extend the uppermost frequency response of magnetic tape recorders have heretofore been investigated. One approach is to disect the signal frequency spectrum into a number of band-pass segments, each of which is heterodyned down to a low frequency range and recorded separately on a multi-track tape or in a time-multiplex arrangement. To recover the original signal on playback, the process is reversed. This system presents serious mechanical and electrical difficulties, particularly the stringent specifications on the many filters required and the low tolerances which must be met in the manufacture and alignment of the many heads.

A second approach, which has enjoyed some acceptance, achieves the necessary relative speed between the tape and recording head by mechanically moving the recording head transversely of the tape at high speed. The tape is advanced past the head, longitudinally of the tape, at a rate of 15 inches/sec. whereby the signal is recorded as a series of transverse lines or tracks. This is known as the Ampex system (Ampex Corporation of Redwood City, California) and is described in considerable detail in Electronics August 1957, pp. 138–144. Although acceptable recording is achieved in this system, it requires the precision assembly of four recording heads on a disc which is rotated at 14,400 r.p.m., and an involved system for accomplishing synchronization of the mechanical assembly (to obtain signal synchronization) during both recording and playback. The susceptibility of the system performance to deterioration due to wear, and the need for frequent replacement of parts because of the high rotational speeds and abrasion of both the tape and the heads, is obvious. Moreover, the rotational speed of the head precludes the use of this recording technique in computer applications where it is frequently necessary to rapidly start and stop the tape and/or the scanning action.

With an appreciation of the shortcomings of available techniques, a primary object of my invention is to provide an improved magnetic tape transducer.

Another object of the invention is to provide a magnetic transducer capable of recording signals at video frequencies, at least as high as those encountered in television signals.

Still another object of the invention is to provide a magnetic transducer for recording video signals as a series of transverse lines or tracks on a tape wherein scanning across the tape is accomplished electrically.

Another object of the invention is to provide a magnetic tape transducer for recording video signals having no moving parts, except of course, the tape transport mechanism.

Another object of the invention is to provide a magnetic tape transducer which is simple and relatively inexpensive to construct yet rugged and dependable, so that maintenance and repairs are held to a minimum, and when necessary, are greatly simplified.

In general, the foregoing objects of the invention are attained by a pair of elongated magnetic permeable members defining a recording gap through which a magnetizable recording medium, such as a tape, is transported. The signal to be recorded is coupled to one of the members to provide across the gap, throughout its length, a magnetic field modulated in accordance with the signal. The other member has means coupled to the ends thereof for producing opposing magnetic fields in the member of sufficient intensity to saturate the member everywhere except in a small region where the fields cancel. Throughout the portions of the member where flux density is sufficiently high to cause saturation, the incremental permeability of the member falls to about the permeability of air, whereas in the region of field cancellation the permeability is high. Thus, although a signal-modulated magnetic field is present throughout the length of the gap, flux passes directly through the tape to the other member only in the high permeability region, and that flux which does not pass directly to the high permeability region travels a long air path back to the first member. Because of the long path the flux density is low, and consequently the signal-modulated magnetic field is of sufficient intensity to be impressed on the tape only at the high permeability zone. By rapidly differentially varying the intensities of the magnetic fields, the high permeability region may be moved along the recording gap, thereby scanning the recording aperture transversely across the tape. Simultaneously, the tape is moved through the gap whereby the recording is laid down along transverse tracks. The tape is transported through the gap at obtainable velocities, for example 30 to 120 inches per second, using available tape transport means, and the rate of scanning of the high permeability zone being limited only by rate at which the saturating magnetic fields can be varied, video signals may readily be recorded.

Other objects, features and advantages of the invention will become apparent from the following description of a preferred embodiment of the invention, reference being had to the accompanying drawings, in which.

Figures 1, 1A, 2, 3:
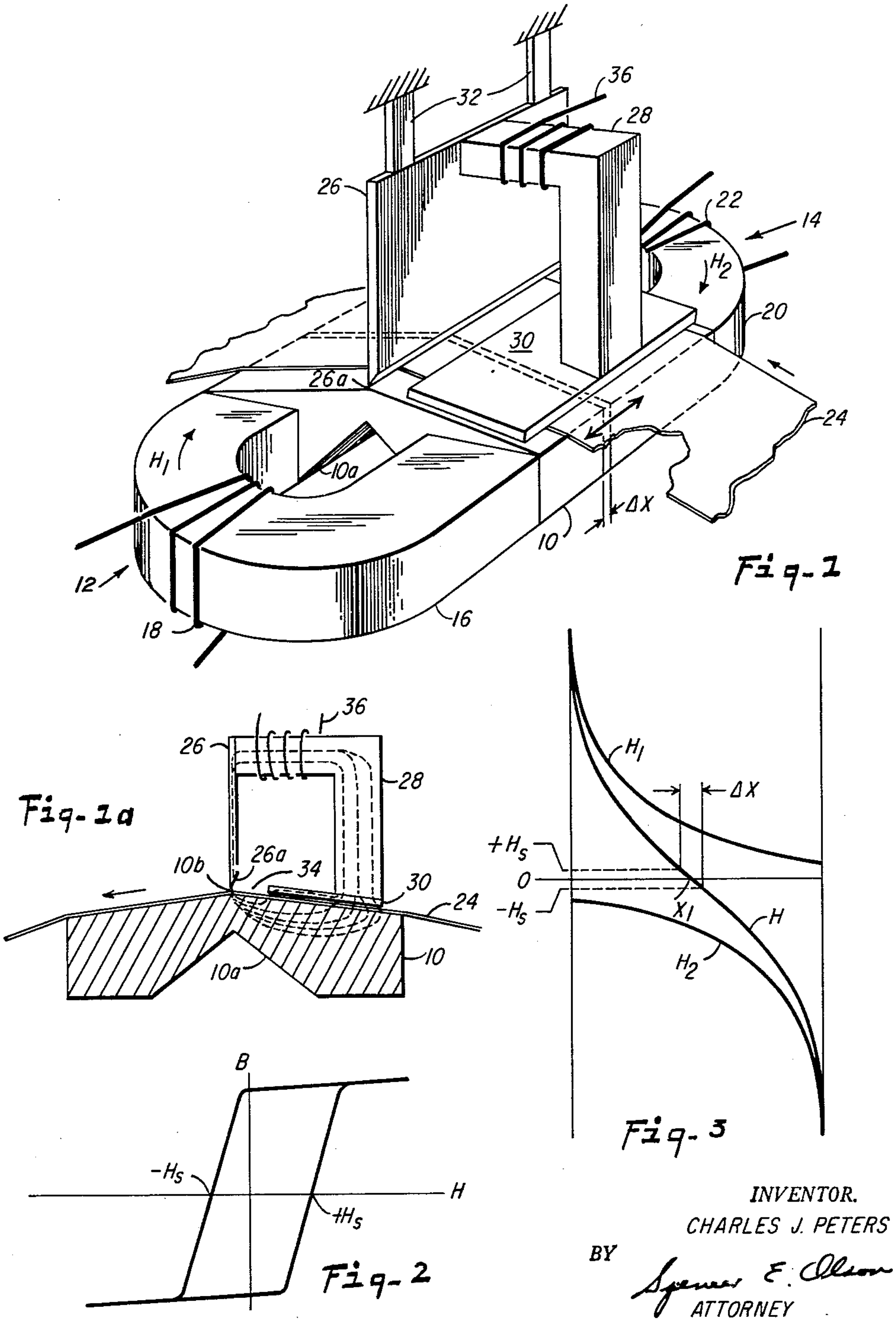
FIG. 1 is an isometric view of a preferred form of the magnetic tape transducer in accordance with the invention.
FIG. 1A is a cross-sectional view taken through FIG. 1.
FIG. 2 is a graph of the B–H characteristic of the ferromagnetic block of the transducer of FIG. 1.
FIG. 3 is a graph illustrating the nature of the magnetic fields required to effect scanning of the aforesaid high permeability zone.

Referring now to the drawings, and more particularly to FIGS. 1 and 1A, the transducer in accordance with the invention includes a generally rectangular block 10 formed of magnetic permeable material, such as iron-nickel ferrite, having a cross-section as shown in FIG. 1A. The block 10 is of generally rectangular cross-section having a central V-shaped notch 10*a* extending longitudinally along the underside, the purpose of which will be explained hereinafter, and the upper side is crowned slightly as shown to provide a central ridge 10*b* which extends across the block. A pair of electromagnets 12 and 14 are respectively mounted at the opposite ends of block 10, each having a U-shaped core formed, for example, of strip iron, and a coil wound on the core for carrying magnetizing current. More particularly, electromagnet 12 comprises a core 16 of a thickness substantially equal to the thickness of block 10 at its edges, mounted with its pole faces in direct contact with the end of the block. The width of the individual pole faces is preferably approximately equal to the distance from the outer edge of block 10 to the outer edge of notch 10*a*. A current coil 18 is wound on the core, the number of turns in the coil and the current to be carried thereby determining the flux produced in the block 10. Electromagnet 14 is of identical construction, the core and coil being respectively designated by numerals 20 and 22, except it is wound to be oppositely magnetized as indicated by the oppositely directed arrows $H_1$ and $H_2$.

With the above-described arrangement, the lines of magnetic flux from one pole of each magnet enter into the ferrite block 10 and return by its other pole. With the magnetic fields produced by the two magnets in opposition, a small region exists within the block where the fields cancel each other. Current is passed through the coils of both magnets of sufficient magnitude to saturate the block 10 everywhere except in a small region around the line when they cancel, the location of this line along the length of the block being determined by the relative magnitudes of the currents applied to the two magnet coils. In the portions where saturation occurs the incremental permeability of the material of block 10 falls to approximately the permeability of air, whereas in the region of field cancellation the permeability of the ferrite material of block 10 is high. This zone of high permeability may be controllably moved across the block by differentially varying the current in coils 18 and 22.

More specifically, the material of block 10, preferably ferrite, has a substantially square magnetic characteristic such as is shown in FIG. 2, and the magnetic fields produced in the block are as shown in FIG. 3. In this graph the magnetic field intensity is plotted along the longitudinal axis of the block, designated its $x$-axis. $\pm H_s$ is the field intensity at which the block material saturates, $H_1$ is the field produced by magnet 12, $H_2$ is the field produced by magnet 14 and H is the total, or resultant field, of fields $H_1$ and $H_2$, for an arbitrary amplitude of current in the two coils. It will be seen that the resultant field H goes to zero at the point designated $x_1$, and that the value of H is insufficient to saturate the material over a region having a width designated $\Delta x$ centered at $x_1$. This zone of width $\Delta x$ has a much higher permeability than the saturated regions and extends across the width of the block 10 as indicated in FIG. 1. The position of $x_1$ is movable lengthwise of the block by changing the current in the coils 18 and 22 whereby the high permeability zone of width $\Delta x$ may be scanned back and forth across the block 10 as indicated by the arrows in FIG. 1. The notch 10*a* provided on the underside of block 10 constrains the magnetic flux produced by magnets 12 and 14 to a smaller cross-sectional area, tending to decrease the width of $\Delta x$ of the high permeability zone for a given number of ampere-turns in coils 18 and 22. This serves to reduce the demands on the scanning of sweeping circuitry, to be described later in connection with FIG. 7.

Assuming that the transducer is to be used for the recording of a video television signal; that one line of the television picture is to occupy one transverse track on the tape of a sweep length of 1.5 inches; that the tape speed is to be 30 in./sec.; and that the line frequency is 15 kilocycles/sec., it is necessary that the dimension $\Delta x$ be about .005 inch. This dimension is arrived at from the equation $$\Delta x = \frac{v}{f}$$

where $v$ is the sweep velocity or 1.5 inches in 70 microseconds, and $f$ is the maximum frequency to be recorded, 4.5 megacycles per second for video television signals. Magnetic fields of suitable intensity to provide a zone of high permeability having a width of .005 inch in a block 10 having a length slightly greater than 2 inches (to accommodate a 2 inch tape) are theoretically possible with electromagnets having a maximum of 2,200 ampere-turns. By differentially varying the magnitude of the current in the two coils, that of coil 18 from its minimum value to its maximum, and that of coil 22 from its maximum to its minimum, the high permeability region may be moved, from the left end of the 1.5 inch sweep to the right end without appreciably changing the width $\Delta x$ of the zone. Assuming that the signal is to be laid down in only one direction of scan, and remembering the earlier made assumptions, it is necessary to change the value of the current in each coil from maximum to minimum and back to maximum, or vice versa, 15,750 times per second.

Having described the means for scanning a high permeability zone across the block 10, reference is again made to FIG. 1 for completion of the description of the transducer. The tape 24 on which the signals are to be recorded, is drawn over the crown of block 10, in contact therewith and preferably with the active side up, by suitable tape transport means to be described. Aligned with the crown 10*b* of block 10, and spaced therefrom is an elongated probe 26 formed with a knife-edge along its lower edge. The edge 26*a* is spaced from the crown 10*a* a distance to allow a clearance of .0005 to .001 inch between the probe and the upper surface of the tape drawn therebetween. Integrally assembled with probe 26 is an L-shaped elbow 28 and an elongated plate 30, the latter being disposed parallel to one of the inclined faces of block 10 and spaced therefrom to provide a clearance of .0005 to .001 inch between it and the tape. The probe and plate assembly is suitably supported on a rigid mounting structure, indicated generally at 32, which preferably includes means for carefully adjusting the spacing of the probe and plate from block 10. The probe, plate and elbow are all made of ferromagnetic material, such as ferrite, and may be joined together with a suitable glue or cement without introducing objectionable gaps at the joints. Thus, the probe, plate and elbow form a closed magnetic circuit except for an elongated high reluctance gap 34 between the edge 26a and plate 30, which may have a width of the order of ¼ inch. The knife-edge 26a of plate 26 together with the crown 10b of block 10 define a recording gap through which the tape is drawn having a length coextensive with the width of the tape. Thus, probe 26 and plate 30 also constitute portions of another closed magnetic circuit, from the knife-edge 26a, through the tape 24, through the high permeability zone in block 10, and back through the tape through a large area air path to the plate 30. The return path through the tape is of sufficiently greater cross-sectional area than the entering path from knife-edge 26a, that the flux in the return path is of insufficient density to be recorded.

The signal to be recorded, for example, a video signal of the order of 4.5 megacycles per second, is applied to a signal coil 36 wound on one section of elbow 28, to provide across the gap between knife-edge 26a and crown 10b, and throughout the length of the gap, a magnetic field modulated in accordance with the signal. This modulation may be what is known in the art as "frequency modulation," a form of density modulation, and may be accomplished by circuitry to be described in connection with FIG. 9. With the signal-modulated magnetic field present across the recording gap throughout its length, the instantaneous signal may be recorded on the tape at any point across its width where the flux density in the tape is sufficient; that is, at the high permeability zone in block 10. In the saturated portions of the block the permeability approaches that of air with the consequence that the flux from knife-edge 26a opposite the saturated regions predominantly travels a longer air path back to the probe structure, for example, across gap 34 to plate 30 without entering the tape, and the density of such flux as does pass through the tape opposite the saturated portions of block 10 is insufficient to be recorded. By reason of the low reluctance path from the edge 26a through the tape to the high permeability zone in block 10, the signal-modulated field is, in effect, concentrated at the high permeability zone, the flux at this narrow region, and this region only, being sufficient to be recorded on the tape 24. Thus, the high permeability zone in block 10 and the elemental portion of knife-edge 26a directly opposite the zone form a "recording aperture" of small dimensions, of the order of .005" ($\Delta x$) in the direction transverse to the tape and about .002" in the direction of tape travel. The latter dimension is determined primarily by the shape of the recording head, mainly the sharpness of edge 26a. This "recording aperture" is rapidly movable transversely of the tape, by differentially varying the intensities of the opposing magnetic fields in block 10, with the signal being recorded on the tape only at the instantaneous position of the aperture.

Figure 4:
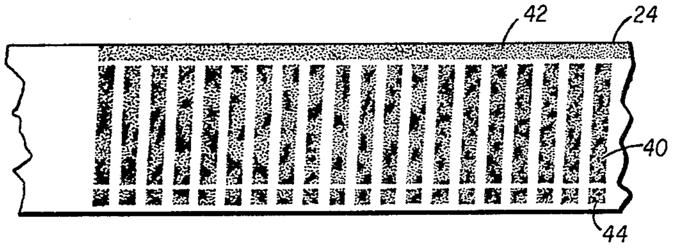
FIG. 4 is a plan fragmentary view of a tape illustrating the pattern of signals recorded thereon.

The recorded tape, in the case of television recording, has three separate, but synchronized magnetic tracks as shown in FIG. 4. The first is a series of transverse video tracks 40, laid down by the transducer just described, and in the assumed example, carries one line of television information. The second is the sound track that accompanies the picture, and may be impressed at the top of the tape at 42 by a suitable audio recording transducer. The third track, indicated at 44 is a synchronizing signal that may comprise a train of pulses coincident with the horizontal synch pulse of each line of the television picture.

Figure 5:
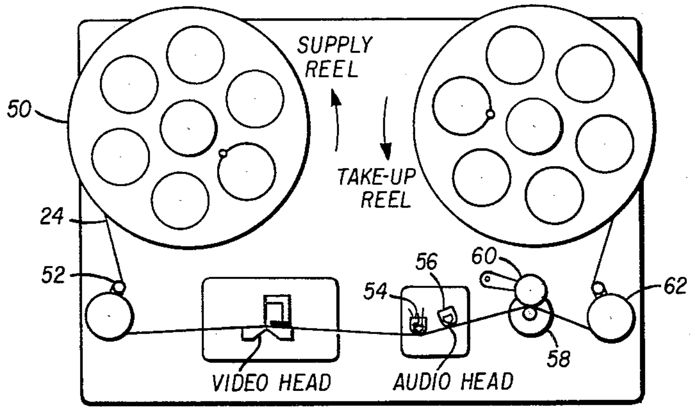
FIG. 5 is a diagrammatic representation of a suitable transport mechanism for drawing the magnetic tape through the transducer.

Referring to FIG. 5, the present transducer may be used with tape transport mechanisms similar to that found in many professional magnetic audio recorders. As illustrated, the tape 24 is supplied from a reel 50 on the left, and is stabilized in its motion by passing around an idler 52. It passes by the video head of the present invention and then goes to an erase and control head 54, which may be a conventional ring-type head, and an audio head 56 which records the sound track. The tape next passes between a drive capstan 58 and its pressure idler 60, around a take-up idler 62 and on to a tape take-up reel 64 on the right. As has been suggested by way of example, the transport mechanism may be designed to draw the tape over the video head at a velocity of 30 to 120 inches per second.

Figure 6:
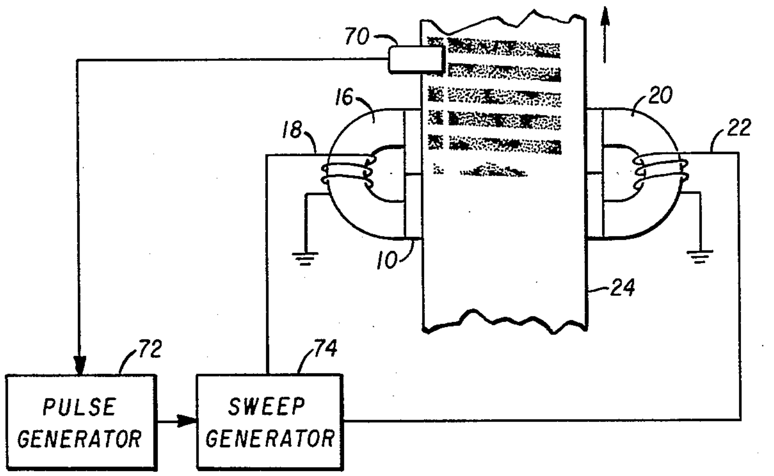
FIG. 6 is a top view, somewhat diagrammatic, of the transducer of FIG. 1, together with a preferred form of associated circuits.

An illustrative recording system employing the transducer of the invention is shown in block diagram form in FIG. 6. During both recording and replay it is necessary to maintain an established relationship between the scanning of the high permeability zone and the movement of the tape. This may be done by the prior recording of pulses 44 on the tape 24 with a spacing therebetween relative to the constant tape speed as to be in time synchronism with the horizontal synch pulses of the horizontal lines of the picture to be recorded. These pulses are picked up by an auxiliary reading head 70, spaced a fixed number of pulse spaces from the recording probe, the output of which actuates a pulse generator 72. The pulse generator produces a rectangular pulse which is applied to a sweep generator 74 adapted to produce two current signals of sawtooth waveform for application to coils 18 and 22, respectively. Each of the currents necessarily has a positive D.C. component, and the two currents must be out of phase, in order to effect scanning. Scanning is preferably done in one direction only, say from left to right in FIG. 6, thus requiring that the current in coils 18 and 22 be at their minimum and maximum, respectively, at the start of the scan, and at maximum and minimum, respectively, at the end of the scan, and rapidly return or "flyback" to their initial values upon completion of a scan.

Figure 7:
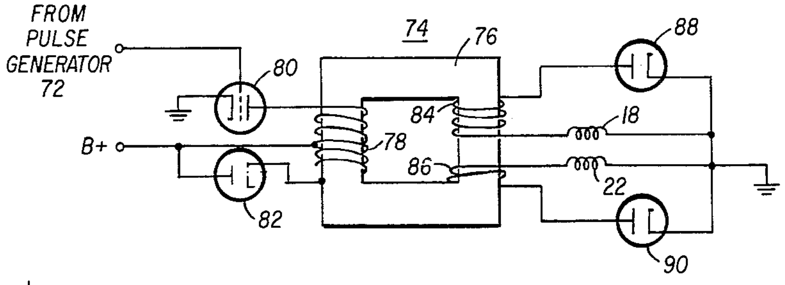
FIG. 7 is a simplified circuit diagram of a sweep generator for use in the system of FIG. 6.

A suitable circuit for generating currents having the necessary waveforms is schematically illustrated in FIG. 7. The modulator comprises a ferromagnetic core 76 having a primary winding 78 wound thereon, one terminal of which is connected to the anode of a triode 80, and the other terminal of which is connected to B+ through a diode 82 polarized as shown. The anode of diode 82 is also connected to a tap on coil 78 at a point near the high potential end. The cathode of triode 80 is grounded, and a positive rectangular pulse from pulse generator 72 is applied to the grid to render the tube conducting for the period of the pulse which is equal to the scan period. On another leg of the core 76 are wound a pair of secondary coils 84 and 86 respectively connected in series with coil 18 and diode 88, and coil 22 and diode 90. The cathodes of diodes 88 and 90, and one terminal of each of coils 18 and 22, are grounded as shown.

Figure 8:
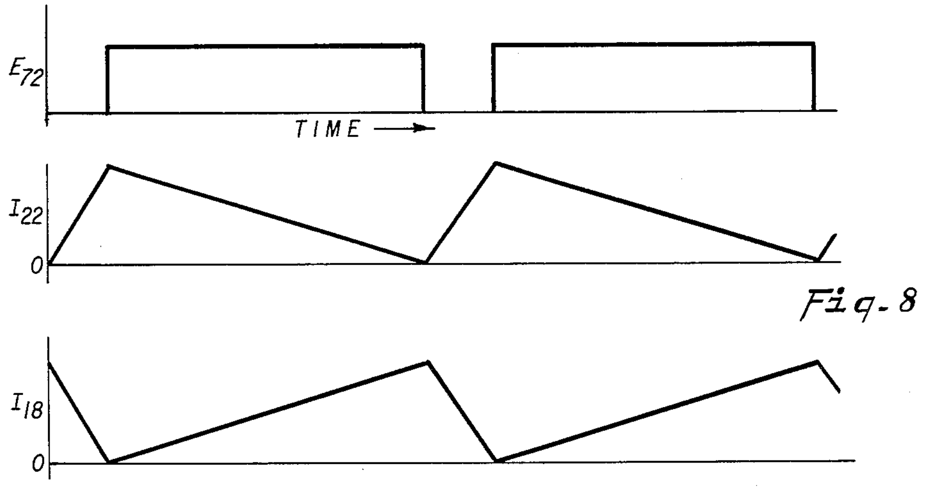
FIG. 8 is a series of wave forms generated by the circuit of FIG. 7.

In operation, when a positive rectangular pulse (FIG. 8) is applied to the grid of triode 80, the tube conducts and B+ is applied across the major portion of coil 78. The current in the coil cannot build up instantaneously, however, the buildup being substantially in accordance with a sawtooth waveform, with the consequence that currents of similar waveform, are induced in windings 84 and 86. Currents of sawtooth waveform therefore flow through coils 18 and 22, the diodes 88 and 90 preventing their going below ground potential. Upon removal of the pulse from the grid of tube 80, the circuit is opened, but since the flux linkage cannot change instantaneously, voltage builds up across the coil in the opposite sense causing current to be driven back into the power supply, this voltage buildup being dependent on the inductance of the tapped portion of coil 78. This reverse voltage buildup is induced in windings 84 and 86, and consequently coils 18 and 22, to bring the currents in the latter coils back to their initial values. If the number of turns of the tapped portion of coil 78 is 1/10 of the total, the "flyback" time is 1/10 of the scan period.

Figure 9:
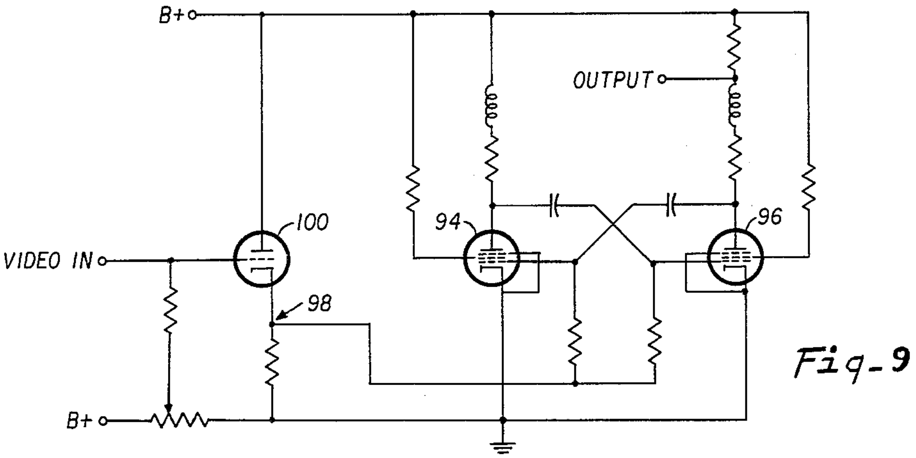
FIG. 9 is a circuit diagram of a preferred form of modulator circuitry for applying the signal to be recorded to the transducer.

Having described in detail a form of scanning circuitry, which it is to be understood is by way of example only, reference is now made to FIG. 9 for a description of suitable circuitry for applying the signal to be recorded to the signal coil 36. Where deviation does not exceed a megacycle, and with carriers that do not exceed 5 to 6 megacycles, a multivibrator type of oscillator whose frequency is controlled by direct application of video to its control grids is satisfactory. The circuit comprises two pentodes 94 and 96, such as the 6CL6, cross-connected as a multivibrator, the control grids of which are driven by a cathode follower 98, the tube 100 of which may be one section of a 5687. The video signal is applied to the control grid of tube 100, whereby the output of the multivibrator, taken from the plate circuit of tube 96, is a series of pulses spaced in accordance with the information in the video signal. The multivibrator output is amplified in a suitable wideband video amplifier and then applied to a suitable drive circuit connected to signal coil 36 of the transducer.

While the system shown by way of example has been described in connection with the recording function, it will be understood that replay is essentially the reverse. Scanning of the transverse tracks is effected by similarly moving a high permeability zone, the scanning being synchronized by means similar to that shown in FIG. 6. The signal picked up is induced in coil 36 and is demodulated by circuitry available to the art, a representative form of which is described in the above-referenced Electronics article.

Although the invention has been described in connection with the recording of television signals, and associated circuitry for such use described, it will be appreciated that it may find other applications. For example, since scanning is accomplished electrically with no mechanical masses to be moved as in the Ampex system, the sweep need not be periodic, and thus is ideally suited for computer applications where the information to be recorded occurs at random times or the computer demands the read-out of information at random times. That is, scanning may be suddenly and rapidly started or stopped as dictated by requirements of recording or read-out and the tape started, stopped, or reversed to provide random access of information. Moreover, with scanning synchronized with pre-recorded pulses, it is possible to record or replay a selected transverse track without having the tape move, a feature lacking in the Ampex system where scanning is synchronized with the rotation of the capstan of the tape transport mechanism.

It is apparent also that those skilled in the art may now make numerous modifications of and departures from the specific embodiment of the transducer described herein without departing from the inventive concepts. Consequently, the invention is to be construed as limited only by the spirit and scope of the appended claims.

What is claimed is:

1. In a magnetic recording system including a magnetizable tape and means to move said tape: a recording unit comprising first and second magnetic permeable members defining a recording gap through which said tape is adapted to be moved, the gap having a length dimension transverse to the direction of movement of the tape, means coupled to said first member for providing across said gap, throughout its length, a magnetic field modulated in accordance with a signal to be recorded, means for producing opposing magnetic fields in said second member of sufficient intensity to saturate said second member everywhere except in a region around a line where the opposing fields cancel, said region having a narrow dimension in the direction transverse to the direction of movement of the tape and higher permeability than the saturated portions of said second member whereby signal-modulated flux across said gap magnetizes the tape opposite said region only, the field producing means also including means for moving said region along the length of said second member.

2. In a magnetic recording system including a magnetizable tape and means to move said tape: a recording unit comprising first and second magnetic permeable members defining a recording gap through which said tape is adapted to be moved, the gap having a length dimension substantially coextensive with the width of the tape, means coupled to said first member for providing across the gap, throughout the length thereof, a magnetic field modulated in accordance with a signal to be recorded, means coupled to opposite ends of said second member for producing opposing magnetic fields in said second member of sufficient intensity to saturate said second member everywhere except in a zone around a line where the opposing fields cancel, said zone having a narrow dimension in the direction transverse to the direction of movement of the tape and a sufficiently higher permeability than the saturated portions of said second member that signal-modulated flux across said gap magnetizes the tape opposite said zone only, the field producing means also including means for rapidly moving said zone along the length of said second member.

3. In a magnetic recording system including a magnetizable tape and means to move said tape: a recording unit comprising first and second substantially coextensive magnetic permeable members arranged closely parallel to each other to define an elongated recording gap through which said tape is adapted to be moved, the gap having its length dimension transverse to the direction of movement of the tape and substantially coextensive with the width of the tape, means coupled to said first member for providing across the gap and throughout its length a magnetic field modulated in accordance with a signal to be recorded, means coupled to opposite ends of said second member for producing opposing magnetic fields in said second member of sufficient intensity to saturate said second member everywhere except in a zone around a line where the opposing fields cancel, said zone having a narrow dimension in the direction transverse to the direction of movement of the tape and a sufficiently higher permeability than the saturated portions of said second member that only that elemental portion of said first member opposite said zone is in effective magnetic linkage with the tape, the field producing means also including means for rapidly scanning said zone along the length of said gap as the tape is moved past the unit whereby the signal is imposed on the tape in tracks arranged transversely of the tape.

4. Apparatus in accordance with claim 3 wherein said first member is formed with an edge confronting said recording gap having a thickness in the direction of movement of the tape of the same order of magnitude as the narrow dimension of said zone.

5. A recording unit for interaction with a magnetizable tape, comprising a magnetic circuit including a sharp-edged pole piece having a length substantially coextensive with the width of said tape, a block of ferromagnetic material arranged closely parallel to said pole piece and with said pole piece defining a recording gap having a length dimension transversely of the tape and through which the tape is adapted to be moved, means coupled to said magnetic circuit for providing across said gap, throughout its length, a magnetic field modulated in accordance with a signal to be recorded, magnetomotive force generating means arranged in opposition and coupled to said block for producing magnetic fields in said block of sufficient intensity to saturate said block everywhere except in a narrow region around a line where the fields cancel, said region having a substantially higher permeability than the saturated portions of the block and shifting along said block as the magnetization of the respective ends of said block are differentially varied.

6. A recording unit comprising a magnetic circuit including two parallel elongated pole pieces defining a high reluctance gap therebetween, a block of ferromagnetic material arranged proximate to said pole pieces and with one of said pole pieces defining an elongated recording gap through which a magnetizable record member is adapted to be moved, means coupled to said magnetic circuit for providing across said recording gap, throughout its length, a magnetic field modulated in accordance with a signal to be recorded, magnetomotive force generating means arranged in opposition and coupled to said block for producing magnetic fields in said block of sufficient intensity to saturate said block everywhere except in a narrow region around a line where the fields cancel, said region having substantially higher permeability than the saturated portions of the block, and means for differentially varying the magnetization of the respective ends of said block to move said region along said recording gap.

7. In a magnetic tape transducing apparatus including means for transporting the tape: a transducing head comprising a magnetic circuit which includes a pair of pole pieces spaced by a high reluctance gap, one of said pole pieces having a sharp edge of a length at least as great as the width of the tape and disposed transverse to the direction of tape travel, means for coupling a signal to be recorded to said magnetic circuit, a block of magnetic permeable material substantially coextensive with said one pole piece and spaced therefrom to define therewith a recording gap through which said tape is adapted to be transported, means for producing opposing magnetic fields in said block of sufficient intensity to saturate the material of said block everywhere except in a narrow region around a line where the fields cancel, which region has a sufficiently higher permeability than the rest of said block that only that elemental portion of the length of said one pole piece opposite said region is in effective magnetic linkage with said tape, said field producing means also including means for electrically moving said region transversely of said tape as said tape is transported past said head to vary the position of the area of magnetic linkage between said head and said tape.

8. A magnetic recording system comprising, a magnetizable tape, a block of ferromagnetic material of a length at least as great as the width of the tape, means coupled to the ends of said block for producing opposing magnetic fields in said block of an intensity to saturate the material of said block everywhere except in a region around a line where the opposing fields cancel, said region having appreciably higher permeability than the saturated portions of said block, means for rapidly differentially varying the intensities of said magnetic fields to scan said high permeability region back and forth between the ends of said block, a magnetic circuit including a member arranged closely parallel to and with said block defining a recording gap substantially coextensive with the width of the tape, means coupled to said magnetic circuit for providing across said gap, throughout the range of scan of said high permeability region, a magnetic field modulated in accordance with a signal to be recorded, and means for moving said magnetizable tape through said gap.

9. An electromagnetic transducer for interaction with a magnetizable tape, comprising a block of magnetic permeable material having a substantially square magnetization characteristic, first and second electromagnets respectively arranged at opposite ends of said block for producing opposing magnetic fields in said block of sufficient intensity to saturate the material of said block everywhere except in a narrow region around a line where the fields cancel, means for differentially varying the currents in said first and second electromagnets to move said region back and forth in said block between the ends thereof, a magnetic circuit including a magnetic permeable member substantially coextensive with said block and spaced closely parallel to said block and defining therewith an elongated recording gap through which said tape is adapted to be moved, and means coupled to said magnetic circuit for providing across said gap, throughout its length, a magnetic field modulated in accordance with a signal to be recorded.

10. In a magnetic tape transducing apparatus including means for transporting the tape in the direction of its longitudinal axis: a transducing head comprising a magnetic core which includes a sharp-edged pole piece having a length substantially coextensive with the width dimension of the tape, a generally rectangular block of ferromagnetic material substantially coextensive with said pole piece and closely spaced parallel thereto to define therewith a recording gap, means coupled to the ends of said block for producing opposing magnetic fields in said block of sufficient intensity to saturate said block everywhere except in a narrow region around a line where the fields cancel, said region having appreciably higher permeability than the saturated portions of said block, means coupled to said magnetic core for providing across said gap, throughout the length of said pole piece, a magnetic field modulated in accordance with a signal to be recorded, the opposing magnetic field means including means for varying the intensities of said opposing magnetic fields as said tape is transported through said gap to move the high permeability region transversely of the tape.

11. Apparatus in accordance with claim 10 wherein the ferromagnetic material of said block has a substantially square magnetization characteristic.

12. Apparatus in accordance with claim 11 wherein the opposing magnetic field producing means comprises a pair of electromagnets magnetically coupled to the respective ends of said block and includes means for differentially varying the magnitude of current applied to said electromagnets.

13. An electromagnetic transducer for interaction with a magnetizable tape comprising, a block of ferromagnetic material having a length substantially equal to the width of said tape, said block being formed with a crown extending longitudinally of one surface thereof, first and second electromagnets respectively magnetically coupled to the opposite ends of said block which when energized with suitable currents produce opposing magnetic fields in said block of sufficient intensity to saturate the material of said block everywhere except in a region around a line where the fields cancel, which region has a much higher permeability than the saturated portions of the block and has a narrow dimension in the direction of the lengthwise dimension of said block, a magnetic core including a sharp-edged plate arranged with its edge closely confronting the crown on said block and a flat plate disposed in a plane closely parallel to said one surface of said block, said sharp-edged plate being coextensive with said block and with said crown defining a recording gap through which a tape is adapted to be moved, the gap having a length dimension transverse to the movement of the tape, means coupled to said magnetic core which when energized by a signal to be recorded produces across said recording gap, throughout its length, a magnetic field modulated in accordance with the signal, said high permeability region shifting along said recording gap as the currents in said first and second electromagnets are differentially varied.

14. Apparatus in accordance with claim 13 including means coupled to said electromagnets for periodically producing currents therein of sawtooth waveform and opposite polarity for rapidly shifting said high permeability region from one end of said gap to the other.

15. Apparatus in accordance with claim 14 further including means for transporting a magnetizable tape through said gap at substantially constant speed whereby said signal is recorded on the tape as closely spaced tracks arranged transversely of the tape.

16. An electromagnetic transducer for interaction with a magnetizable tape comprising, an elongated member formed of magnetic permeable material, means coupled to said member and arranged to produce opposing magnetic fields within said member of sufficient intensity to saturate the material whereby a narrow high permeability region is produced in said member around a line where the fields cancel, said region shifting along the member as the intensities of said opposing fields are differentially changed, a magnetic circuit including a magnetic permeable member closely spaced to said elongated member and defining therewith a recording gap through which a tape is adapted to be moved, and a signal coil coupled to said magnetic circuit.

17. In magnetic tape transducing apparatus including means for transporting the tape, a transducing head comprising a magnetic circuit which includes a pole piece having a sharp edge of a length at least as great as the width of the tape and disposed traverse to the direction of tape travel, means for coupling a signal to be recorded to said magnetic circuit, a member formed of magnetic permeable material substantially coextensive with said pole piece and spaced therefrom to define therewith a recording gap through which said tape is adapted to be transported, means for producing opposing magnetic fields within said member of sufficient intensity to saturate the material of said member whereby a narrow high permeability region is produced in said member around a line where the fields cancel, said region shifting along the member as the intensities of said opposing fields are differentially varied, the permeability of said region being sufficiently higher than the rest of said member that only that elemental portion of the length of said pole piece opposite said region is in effective magnetic linkage with said tape.

18. An electromagnetic transducer for interaction with a magnetizable tape, comprising a member formed of magnetic permeable material, means coupled to said member for producing opposing magnetic fields within said member of an intensity to saturate the material of said member everywhere except in a region around a line where the fields cancel, means for differentially varying the intensities of said magnetic fields to vary the position of said region in said member, a magnetic circuit including a magnetic permeable member spaced closely to said member and defining therewith a recording gap through which a tape is adapted to be moved, and means coupled to said magnetic circuit for providing across said recording gap a magnetic field modulated in accordance with a signal to be recorded.

19. An electromagnetic transducer for interaction with a magnetizable tape, comprising an elongated member formed of magnetic permeable material, means coupled to the ends of said member for producing opposing magnetic fields within said member of an intensity to saturate the material of said member everywhere except in a narrow region where the fields cancel, means for varying the intensities of said magnetic fields to vary the position of said region along the length of said member, a magnetic circuit including a magnetic permeable member spaced closely parallel to said member and defining therewith a recording gap through which a tape is adapted to be moved, and means coupled to said magnetic circuit for providing across said recording gap a magnetic field modulated in accordance with a signal to be recorded.

20. In magnetic tape transducing apparatus including means for transporting the tape in the direction of its longitudinal axis, a transducer comprising an elongated member formed of magnetic permeable material having a substantially square magnetization characteristic, means coupled to said member for producing opposing magnetic fields within said member of an intensity to saturate the material of said member everywhere except in a region around a line where the fields cancel, said region shifting along the member transversely of the tape as the intensities of said opposing fields are differentially varied, the permeability of said region being sufficiently higher than the rest of said member that only that elemental portion of the length of said pole piece opposite said region is in effective magnetic linkage with said tape, a magnetic circuit including an elongated probe formed of magnetic permeable material closely spaced from said member and therewith defining a recording gap through which said tape is transported, and means coupled to said magnetic circuit for providing across said gap, throughout the range of movement of said region, a magnetic field modulated in accordance with a signal to be recorded.

21. In magnetic tape transducing apparatus including means for transporting the tape in the direction of its longitudinal axis, a transducer comprising a member formed of magnetic permeable material having a substantially square magnetization characteristic and having a length at least as great as the width of the tape, means coupled to opposite ends of said member for producing opposing magnetic fields within said member of an intensity to saturate the material of said member everywhere except in a region around a line where the fields cancel, said region shifting along the member as the intensities of said opposing fields are differentially varied, the permeability of said region being sufficiently higher than the rest of said member that only that elemental portion of the length of said pole piece opposite said region is in effective magnetic linkage with said tape, means for differentially varying the intensities of said magnetic fields to controllably move the position of said region back and forth in said member in a direction transversely of the tape, a magnetic circuit including an elongated probe formed of magnetic permeable material closely spaced from said member and therewith defining a recording gap through which said tape is transported, and means coupled to said magnetic circuit for providing across said gap, throughout the range of movement of said region, a magnetic field modulated in accordance with a signal to be recorded.

22. In magnetic tape transducing apparatus including means for transporting the tape in the direction of its longitudinal axis, a transducer comprising a member formed of magnetic permeable material having a substantially square magnetization characteristic and having a length at least as great as the width of the tape, first and second electromagnets respectively coupled to the opposite ends of said member which when energized with suitable currents produce opposing magnetic fields within said member of an intensity to saturate the material of said member everywhere except in a region around a line where the fields cancel, which region has an appreciably higher permeability than the saturated portions of the member and has a narrow dimension in the direction of the lengthwise dimension of said member, a magnetic circuit including an elongated probe formed of magnetic permeable material and having a narrow dimension in the direction of travel of the tape, said probe being spaced closely parallel to said member and defining therewith an elongated recording gap through which said tape is transported, and means coupled to said magnetic circuit which when energized by a signal to be recorded produces across said recording gap, throughout its length, a magnetic field modulated in accordance with the signal, said high permeability region being controllably positioned along said recording gap by varying the currents in said electromagnets.

23. A recording unit for interaction with a magnetizable medium comprising, first and second elongated unconnected magnetic permeable members spaced closely parallel to each other and defining a recording gap through which said medium is adapted to be moved, a signal coil coupled to said first member, and means coupled to said second member arranged to produce opposing magnetic fields in said second member of sufficient intensity to saturate said second member everywhere except in a narrow region around a line where the fields cancel, said last-mentioned means including means for moving said region along the length of said second member.

24. An electromagnetic transducer for interaction with a magnetizable medium comprising, a first elongated magnetic permeable member, a second elongated magnetic permeable member arranged parallel to and spaced from said first member by an air gap, means coupled to said first member for producing across said gap a magnetic field modulated in accordance with a signal to be recorded on a magnetizable medium adapted to be moved through said gap, and means for defining and locating the path for magnetic flux from said first member through said medium and into said second member comprising means coupled to opposite ends of said second member for producing therein opposing magnetic fields of sufficient intensity to saturate said second member everywhere except about a narrow line when the opposing fields cancel to thereby produce in said second member a narrow high permeability region bounded by wider regions of low permeability, and means for shifting said high permeability region along said second member.

25. A transducer for interaction with a magnetizable tape comprising, a magnetic circuit arranged on one side of the tape and including a high reluctance air gap extending across the width of the tape, means coupled to said first magnetic circuit for producing along the length of said air gap a magnetic field modulated in accordance with a signal to be recorded, an elongated member formed of magnetic permeable material arranged on the other side of the tape, transversely thereof, and closely parallel to said air gap, means coupled to said member for producing therein opposing magnetic fields of sufficient intensity to everywhere saturate said member except in the region where the magnetic fields in said member cancel to thereby produce a narrow high permeability region bounded by regions of relatively lower permeability, said magnetic circuit being closed by a low reluctance path at the position of said high permeability region to cause magnetization of the tape only at the position of the high permeability region, and means for shifting said high permeability region along said member.

26. A transducer for interaction with a magnetizable tape comprising, a magnetic circuit arranged on one side of the tape and including an elongated high reluctance air gap extending transversely of the tape and substantially coextensive with the width of the tape, means coupled to said first magnetic circuit for producing along the length of said air gap a magnetic field modulated in accordance with a signal to be recorded, an elongated member formed of magnetic permeable material arranged on the other side of the tape, transversely thereof, and closely parallel to said air gap, a recording gap existing between said magnetic circuit and said elongated member through which the tape can be moved, means coupled to the ends of said member for producing therein opposing magnetic fields of sufficient intensity to everywhere saturate said member except in the region where the magnetic fields in said member cancel to thereby produce a narrow high permeability region bounded by regions of relatively lower permeability, said magnetic circuit being closed by a low reluctance path at the position of said high permeability region to cause a magnetic flux across said recording gap which magnetizes the tape only at the position of the high permeability region, and means for shifting said high permeability region along said elongated member.

27. An electromagnetic transducer for interaction with a magnetizable tape comprising, a magnetic circuit arranged on one side of the tape including an elongated high reluctance air gap extending across the width of the tape and bounded on one side by a sharp-edged probe positioned normal to the plane of the tape, means coupled to said magnetic circuit for producing along the length of said air gap a magnetic field modulated in accordance with a signal to be recorded, an elongated member formed of magnetic material disposed on the other side of the tape, transversely thereof, and closely parallel to the sharp edge of said probe, a recording gap existing between said probe and said elongated member through which the tape may be moved, means coupled to the ends of said member for producing therein opposing magnetic fields of sufficient intensity to everywhere saturate said member except in the region where the magnetic fields in said member cancel to thereby produce a narrow high permeability region bounded by regions of relatively lower permeability, said magnetic circuit being closed by a low reluctance path only at the position of said high permeability region in said elongated member giving rise to a magnetic flux across said recording gap which magnetizes the tape only at the position of the high permeability region, and means for shifting said high permeability region along said elongated member.

28. A transducer for interaction with a magnetizable tape comprising, a magnetic circuit including a high reluctance air gap extending across the width of the tape and bounded on one side by a first magnetic permeable member, a signal coil coupled to said first member, a second magnetic permeable member disposed on the other side of the tape and spaced closely parallel with said first member and defining a recording gap through which said tape is adapted to be moved, and means coupled to said second member arranged to produce opposing magnetic fields in said second member of sufficient intensity to everywhere saturate said second member except in a narrow region around a line where the fields cancel, said magnetic circuit being closed by a low reluctance path only at the position of said high permeability region in said second member, said last-mentioned means including means for moving said region along the length of said second member.

29. A transducer for interaction with a magnetizable medium comprising, a magnetic circuit arranged on one side of the magnetizable medium and including an elongated high reluctance air gap bounded on one side by a first magnetic permeable member, a second magnetic permeable member disposed on the other side of the magnetizable medium and spaced closely parallel to said first member and therewith defining a recording gap through which said magnetizable medium is adapted to be moved, a signal coil coupled to said magnetic circuit, means for producing in said second member opposing magnetic fields of sufficient intensity to everywhere saturate said second member except in the region where the magnetic fields in said member cancel to thereby produce a narrow high permeability region bounded by regions of relatively lower permeability, and means for shifting said high permeability region along said second member.

References Cited in the file of this patent

UNITED STATES PATENTS

| | | |
|---|---|---|
| 2,517,808 | Sziklai | Aug. 8, 1950 |
| 2,743,320 | Daniels | Apr. 24, 1956 |
| 2,762,861 | Somers | Sept. 11, 1956 |
| 2,955,169 | Stedtnitz | Oct. 4, 1960 |

FOREIGN PATENTS

| | | |
|---|---|---|
| 1,026,974 | Germany | Mar. 27, 1958 |
| 336,988 | Switzerland | May 16, 1955 |